United States Patent [19]

Drori

[11] Patent Number: 4,473,525

[45] Date of Patent: Sep. 25, 1984

[54] METHOD OF MAKING FLUID DISTRIBUTION DEVICES PARTICULARLY USEFUL FOR DRIP IRRIGATION

[76] Inventor: Mordeki Drori, 89 Lahal St., Kiron, Israel

[21] Appl. No.: 86,629

[22] Filed: Oct. 19, 1979

[30] Foreign Application Priority Data

Oct. 25, 1978 [IL] Israel .................................. 55798

[51] Int. Cl.³ .............................................. B29C 17/07
[52] U.S. Cl. .................................... 264/508; 138/121;
156/244.13; 156/244.18; 156/244.21; 239/542;
264/514; 264/156; 264/173
[58] Field of Search ................................ 264/514–515,
264/506, 155, 508, 156, 531, 507; 425/503;
138/121, 122; 239/542, 547; 405/43, 45, 49;
156/244.13, 244.18, 244.21

[56] References Cited

U.S. PATENT DOCUMENTS

| | | | |
|---|---|---|---|
| 3,604,728 | 9/1971 | Blass et al. | 239/542 |
| 3,777,987 | 12/1973 | Allport | 239/542 |
| 3,887,138 | 6/1975 | Gilead | 239/542 |
| 3,981,452 | 9/1976 | Eckstein | 239/542 |
| 3,996,323 | 12/1976 | Hegler et al. | 264/514 |
| 4,006,599 | 2/1977 | Hegler et al. | 405/49 |
| 4,022,384 | 5/1977 | Hoyle et al. | 239/542 |
| 4,145,387 | 3/1979 | Hegler et al. | 264/514 |
| 4,175,882 | 11/1979 | Gilead | 138/103 |
| 4,195,784 | 4/1980 | Giiead | 239/542 |

FOREIGN PATENT DOCUMENTS 1535624 7/1968 France ................................ 239/547

Primary Examiner—Jeffery R. Thurlow
Attorney, Agent, or Firm—Benjamin J. Barish

[57] ABSTRACT

A fluid distribution device particularly useful as a drip irrigation emitter, comprises: a continuous plastic tube for conveying the fluid therethrough; and a plurality of individual plastic sleeves enclosing and fixed to the tube at longitudinally-spaced sections along the length of the tube; each of the sleeves being deformed to define a pressure-dropping fluid passageway between its inner surface and the outer surface of the section of the tube enclosed thereby; each of said tube sections having an inlet opening through the tube wall leading to the interior of the tube, and an outlet leading externally of the plastic sleeve.

4 Claims, 10 Drawing Figures

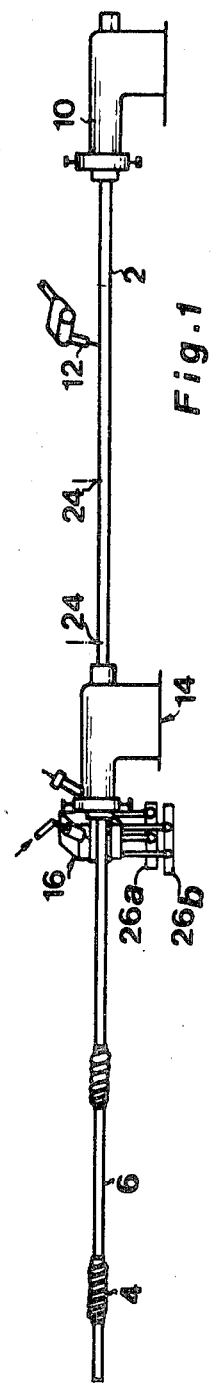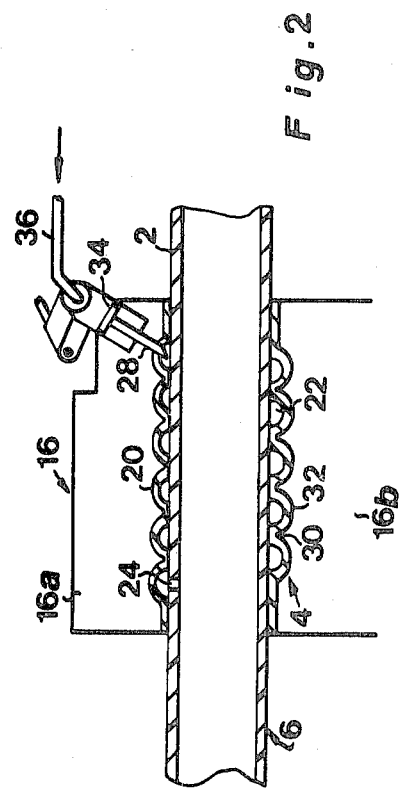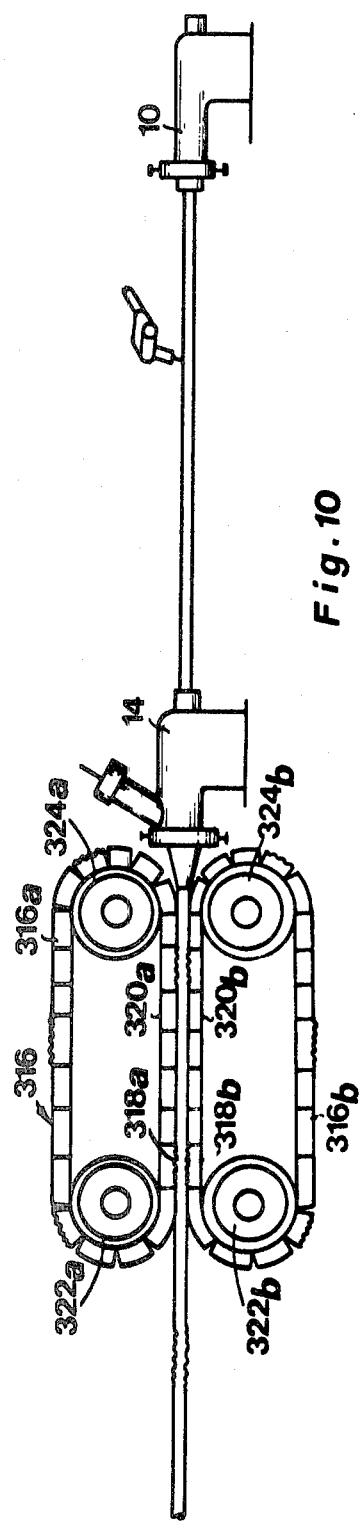

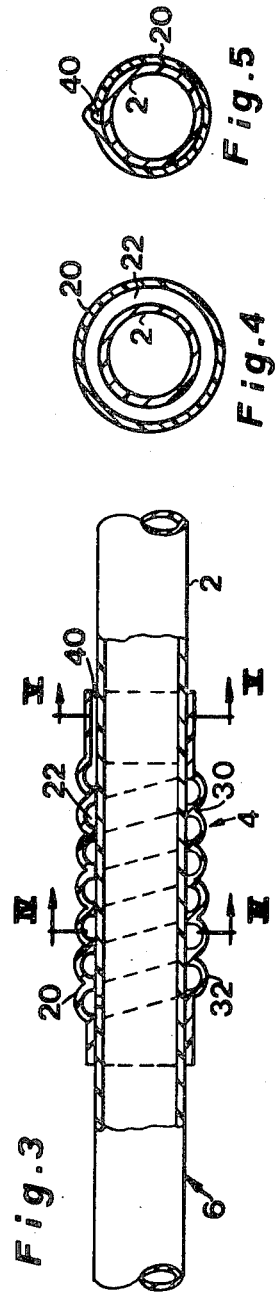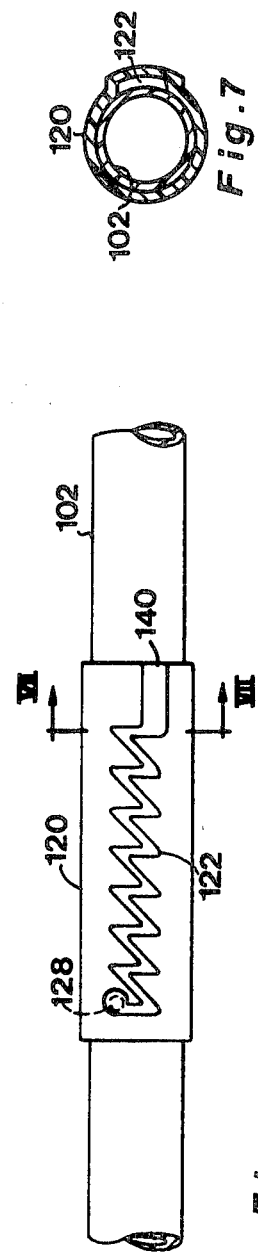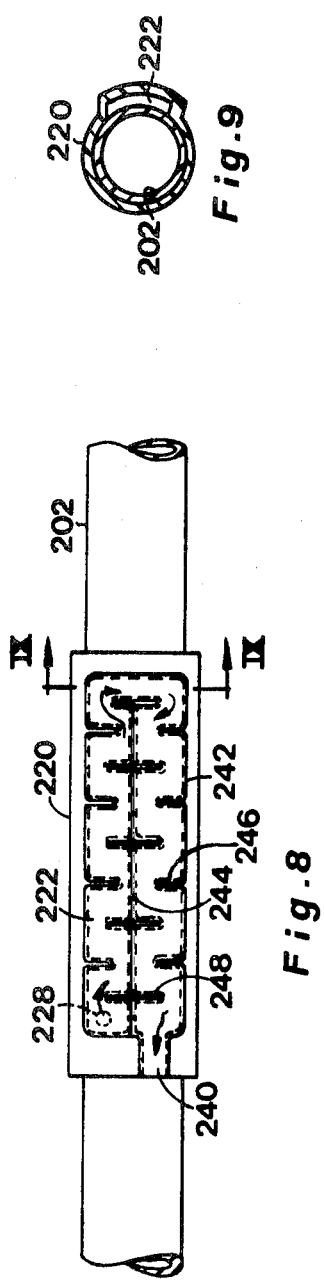

METHOD OF MAKING FLUID DISTRIBUTION DEVICES PARTICULARLY USEFUL FOR DRIP IRRIGATION

BACKGROUND OF THE INVENTION

The present invention relates to fluid distribution devices which are particularly useful as drip irrigation emitters. The invention also relates to a method and apparatus for making such devices.

One known type of drip emitter, commonly called a linearsource emitter or tube dripper, includes a continuous tube formed with a plurality of longitudinally-spaced outlet openings such that the tube serves both as a feed tube for feeding the water, and as an emitter for emitting the water at low rates at longitudinally-spaced locations along the tube length. A large number of different constructions have been proposed, for example as illustrated in U.S. Pat. Nos. 3,777,987, 3,887,138, 3,981,452 and 4,053,109. To date, however, the drip irrigation technique has been commercially applied only to a small fraction of crops requiring irrigation mainly because of the high cost of manufacture and/or the high sensitivity to clogging of the known emitter devices.

An object of the present invention is to provide a fluid-distribution device particularly useful as a drip irrigation emitter which may be produced at low cost by a continuous manufacturing process, and which provides low sensitivity to clogging.

BRIEF SUMMARY OF THE INVENTION

According to one aspect of the present invention, there is provided a fluid distribution device particularly useful as a drip irrigation emitter, comprising: a continuous plastic tube for conveying the fluid therethrough; and a plurality of individual plastic sleeves enclosing and fixed to the tube at longitudinally-spaced sections along the length of the tube; each of the sleeves being deformed to define a pressure-dropping fluid passageway between its inner surface and the outer surface of the section of the tube enclosed thereby; each of said tube sections having an inlet opening through the tube wall leading to the interior of the tube, and an outlet leading externally of the plastic sleeve.

According to another aspect of the invention, there is provided a method of making the above fluid distribution device, comprising: feeding a continuous plastic tube through a piercing station in which an opening is formed in the tube wall at each of a plurality of longitudinally-spaced sections along the length of the tube; subsequently applying a plurality of plastic sleeves with a plastic sleeve enclosing the tube at each of said longitudinally-spaced sections and the opening through the tube wall at each of said sections; and deforming each plastic sleeve to fix it to the tube section enclosed thereby and to define a pressure-dropping passageway between the inner surface of the sleeve and the outer surface of the respective tube section.

According to a third aspect of the invention, there is provided apparatus for performing the above method, comprising: a first extruder for extruding a plastic tube through a continuous path; a piercing unit in said path intermittently actuated for forming an opening through the wall of the extruded tube at longitudinally-spaced sections along its length; a second extruder intermittently actuated for extruding a plastic sleeve around the tube at each of said longitudinally-spaced sections, each sleeve enclosing the opening through the tube wall at each of said sections; and a blow-mold at the downstream side of said second extruder and actuated to deform each of said plastic sleeves to fix it to the tube enclosed thereby and to define a pressure-dropping passageway between its inner surface and outer surface of the respective tube section.

The above aspects of the invention permit linear-source drip emitters to be constructed in large volume, at low cost, and with pressure-dropping passageways of large cross-sectional areas thereby providing low sensitivity to clogging.

BRIEF DESCRIPTION OF THE DRAWINGS

The invention is herein described, by way of example only, with reference to the accompanying drawings, wherein:

FIG. 1 diagrammatically illustrates one form of apparatus for producing linear-source drip emitters in accordance with the present invention;

FIG. 2 is an enlarged fragmentary view illustrating a portion of the apparatus of FIG. 1 and a portion of the drip emitter constructed thereby;

FIG. 3 is a sectional view illustrating the portion of the drip emitter shown in FIG. 2, but including a modification in its structure;

FIGS. 4 and 5 are transverse sectional views, along lines IV—IV and V—V respectively, of FIG. 3;

FIG. 6 is an elevational view of another form of drip emitter constructed in accordance with the invention;

FIG. 7 is a sectional view along lines VII—VII of FIG. 6;

FIG. 8 is an elevational view of a further form of drip emitter constructed in accordance with the invention;

FIG. 9 is a sectional view along lines IX—IX of FIG. 8; and

FIG. 10 illustrates a variation in the apparatus of FIG. 1.

DESCRIPTION OF PREFERRED EMBODIMENTS

The apparatus illustrated in FIG. 1 produces a continuous emitter tube, generally designated 2, including a plurality of pressure-dropping emitter sections 4 longitudinally-spaced along the length of the tube, the emitter sections 4 being interconnected together by non-emitter sections 6 of the tube.

Briefly, the apparatus comprises: a first extruder 10 which may be of a known construction and which extrudes the plastic tube through a continuous path; a piercing unit 12 in its path and intermittently actuated for forming an opening through the wall of the extruded tube at longitudinally-spaced sections along its length; a second extruder 14 for extruding a plastic sleeve around the tube at each of the longitudinally-spaced sections which sleeve encloses the opening formed by piercing unit 12 through the tube wall at the respective section; and a blow-mold, generally designated 16, immediately downstream of extruder 14 and effective to deform each of the plastic sleeves to fix same to the tube section enclosed thereby and to define a pressure-dropping fluid passageway between its inner surface and the outer surface of the respective tube section.

FIG. 2 illustrates a fragment of the tube 2 produced by the apparatus of FIG. 1 which fragment includes one of the emitter sections 4 and the adjacent interconnecting non-emitter sections 6. The fragment illustrated in FIG. 2 is at the station in the apparatus of FIG. 1 including the blow-mold 16 which deforms the plastic sleeve, designated 20 in FIG. 2, applied by extruder 14 to define the pressure-dropping passageway 22, between the inner surface of the sleeve 20 and the outer surface of the tube section enclosed thereby. Plastic sleeve 20 also encloses the hole, designated 24 in FIGS. 1 and 2, through the tube wall produced by the piercing unit 12.

The blow-mold 16, which deforms the plastic sleeve 20 to define the pressure-dropping passageway 22, may be of a known construction, and is therefore only schematically illustrated in FIGS. 1 and 2. It includes two half-sections 16a, 16b having inner faces conforming to the shape to which the sleeve 20 is to be deformed, which sections straddle the opposite sides of the extruded sleeve 20. Sleeve 20 is extruded by extruder 14 to have a diameter larger than the outer diameter of the tube 2. The two mold sections 16a, 16b are actuatable to close into engagement with the sleeve 20, at which time pressurised air is supplied in the space between the outer surface of tube 2 and the inner surface of the sleeve 20 to force the sleeve to conform to the configuration of the mold sections 16a, 16b. The two mold sections are mounted on rails, shown at 26a and 26b in FIG. 1, so that the two closed sections may move with the tube 2, and the sleeve 20 extruded thereover, until the two sections are opened to release the sleeve from between them. Thus, the tube 2 may be fed in a continuous manner rather than in a step manner. Since such blow-molds are well known, further details of its construction are not deemed necessary.

In the arrangement illustrated in FIGS. 1 and 2, the pressurised air forcing the extruded sleeve 20 against the inner faces of the mold sections 16a, 16b, is applied via a hollow piercing element 28 (FIG. 2) which forms a hole through the plastic sleeve 20 at the end of the sleeve opposite to that of opening 24 in tube 2. As soon as element 28 has pierced sleeve 20, it applies pressurised air to the space 22 between the sleeve and the tube 2. This pressurised air forces the sleeve 20, which is still soft from the extruder 14, to assume the configuration of the mold sections 16a, 16b. A helical configuration is shown in the example illustrated in FIGS. 1 and 2. After the sleeve 20 has been so deformed, the valleys 30 of the helix firmly and sealingly engage the outer surface of tube 2 (this being assured by properly dimensioning the mold section 16a, 16b, and/or permitting the sleeve to form a shrink-fit into the tube 2), whereas the crests 32 of the helix are spaced from the outer face of tube 2 to define the helical pressure-dropping fluid passageway 22 between the deformed sleeve 20 and the outer face of the tube 2. The inlet to this passageway is constituted by hole 24 formed by piercing unit 12 through the wall of tube 2; and the outlet from this passageway is constituted by the hole formed by the hollow piercing unit 28 of the blow-mold 16 through the sleeve 20.

The hollow piercing element 28 is intermittently actuated by a piston 34. Pressurised air is supplied via a tube 36 for actuating the piston as well as for forcing the sleeve 22 against the mold sections 16a, 16b to deform the tube into the helical configuration providing the pressure-dropping fluid passages 22. This pressurised air is thus not only effective to maintain the helical passageway open as the sleeve is bonded at its valleys to the tube, but also to cool the sleeve by the flow of the air through the passageway.

It will be appreciated that the sleeves 20 could be deformed in other manners. For example, the pressurised air could be supplied through the tube 2, e.g., from the extruder 10 end, the pressurised air entering the space 22 via the inlet hole 24 formed by the piercing unit 12. In such an arrangement the opposite end of the sleeve would have to be closed between it and the tube so as to permit the pressurised air to force the sleeve into engagement with the mold sections 16a, 16b, the latter deforming the sleeve to define the pressure-dropping passageway 22. The outlet could be in the form of a hole made by a piercing element corresponding to 28 in FIG. 2, except that such a piercing element would only form the outlet hole and would not apply the pressurised air; alternatively, the outlet could be in the form of a recess in the edge of the plastic sleeve, which recess could also define an outlet passageway between the sleeve and the outer surface of the tube 2 enclosed thereby.

The latter arrangement is illustrated in FIGS. 3–5 showing the same fragment as in FIG. 2 of the emitter device produced by the apparatus of FIG. 1, except that instead of having an outlet opening produced by the piercing unit 28 (FIG. 2), the outlet is provided by a recess 40 in the edge of the plastic sleeve 20 opposite to the inlet hole 24 in the tube 20. The formation of this outlet recess 40 is provided by the configuration of the mold plates 16a, 16b.

The mold plates 16a, 16b may also be selected to provide other configurations for the pressure-dropping passageways produced by the deformation of the sleeves 20. FIGS. 6 and 7 illustrate one such configuration; and FIGS. 8 and 9 illustrate another such configuration. In both of these examples, the pressure-dropping passageway formed by the deformation of each sleeve 20 extends only for a portion of the circumference of the tube 2, as distinguished from the arrangement illustrated above with respect to FIGS. 1–5 wherein the pressure-dropping passageway extends for the complete circumference of the tube.

In the example illustrated in FIGS. 6 and 7, the outer sleeve 120 is deformed to define a sinuous passageway 122 having an inlet through the wall of tube 102, as shown by broken lines 128, and an outlet in the form of a recess 140 comparable to recess 40 in FIG. 3.

In the example illustrated in FIGS. 8 and 9, the pressure-dropping passageway 222 is of another sinuous configuration, being defined by an outer, looped, axially-extending rib 242, and an intermediate axially-extending rib 244, both ribs being formed with transverse projections 246, 248, to continuously change, in a sinuous manner, the flow of water through the passageway 222. A hole, shown by broken lines 228, through the tube wall constitutes the inlet to this passageway, and a recess 240 in the edge of the sleeve 220, constitutes the outlet from the passageway, both as in the embodiments of FIGS. 3 and 6, except that the outlet recess 240 is on the same side of sleeve 220 as the inlet 228.

FIG. 10 illustrates a variation to the apparatus of FIG. 1, wherein the mold, therein designated 316, following the extruder 14, includes two continuously moving endless belt sections 316a, 316b disposed on opposite sides of the extruded sleeve 20. Each of the belt sections includes a plurality of spaced half-mold plates 318a, 318b joined together by an endless-loop toothed belt 320a, 320b. The two belts are driven by a pair of aligned rollers 322a, 322b at one end and another pair of aligned rollers 324a, 324b at the opposite end, at the same linear velocity as the tube extruded by extruder 10 and the sleeve 20 extruded by extruder 14, so that the mold plates move with the extruded sleeve as they form the undulations on its outer surface. The arrangement of FIG. 10 thus provides a continuous operation of the undulation-forming unit, rather than an intermittent operation as in FIG. 1.

While the invention has been described with respect to several preferred embodiments, it will be appreciated that these are described for purposes of examples only and that many other variations and applications of the invention may be made.

What is claimed is:

1. A method of making a fluid distribution device, comprising: feeding a continuous plastic tube through a piercing station in which an opening is formed in the tube wall at each of a plurality of longitudinally-spaced sections along the length of the tube; subsequently applying a plurality of individual plastic sleeves with a plastic sleeve enclosing the tube at each of said longitudinally-spaced sections and the opening through the tube wall at each of said sections; and deforming each plastic sleeve to fix it to the tube section enclosed thereby and to define a pressure-dropping passageway between the inner surface of the sleeve and the outer surface of the respective tube section.

2. The method according to claim 1, wherein each plastic sleeve is applied by extrusion, and is deformed by a blow-mold.

3. The method according to claim 2, wherein the blow-mold is pressurised by a hollow piercing element which forms a hole through the plastic sleeve and applies pressurised air therethrough, the hole so formed constituting the outlet of the pressure-dropping passageway during use of the fluid distribution device.

4. The method according to claim 2, wherein the blow-mold is pressurised by applying pressurised air through the tube and the inlet opening formed therein to the space between the respective section of the tube, and the plastic sleeve extruded thereover.

* * * * *